United States Patent [19]

Mabey

[11] Patent Number: 4,591,113
[45] Date of Patent: May 27, 1986

[54] AIRCRAFT CONTROLS

[75] Inventor: Dennis G. Mabey, Bedford, England

[73] Assignee: The Secretary of State for Defence in Her Britannic Majesty's Government of the United Kingdom of Great Britain and Northern Ireland, London, England

[21] Appl. No.: 611,159

[22] Filed: May 17, 1984

[30] Foreign Application Priority Data

May 26, 1983 [GB] United Kingdom ................. 8314656

[51] Int. Cl.[4] .......................... B64C 9/34; B64C 13/16
[52] U.S. Cl. .................................... 244/76 C; 244/213
[58] Field of Search ...................... 244/76 C, 113, 213, 244/75 R, 75 A

[56] References Cited

U.S. PATENT DOCUMENTS

| 2,344,945 | 3/1944 | Knox et al. | 244/113 |
| 2,420,932 | 5/1947 | Cornelius | 244/76 C |
| 2,541,704 | 2/1951 | Koppen | 244/213 |
| 3,734,432 | 5/1973 | Low | 244/76 C |
| 4,227,662 | 10/1980 | Fisher et al. | 244/76 C |

Primary Examiner—Galen L. Barefoot
Attorney, Agent, or Firm—William R. Hinds

[57] ABSTRACT

On an aircraft having spoilers on the wing, the spoilers are converted, according to this invention, following the ACT philosophy, for use in countering gust effects. Accordingly, a sensor of gusts is arranged to transmit warning of the arrival of a significant gust to a spoiler operator which, taking into account airspeed, deploys the spoilers in a mode so that a phase of spoiler generated lift decrement is timed to coincide with effective arrival of the gust.

11 Claims, 11 Drawing Figures

(a) EXTENSION  (b) RETRACTION

Fig.3.

| α = 0°<br>PERFORATIONS OPEN | | RATE<br>(°/S) |
|---|---|---|
| T = 6.3 ms | △ | 5500 |
| T = 11.3 ms | □ | 2800 |

(a) UPPER SURFACE

(b) LOWER SURFACE

Fig. 11.

(a) UPPER SURFACE (b) LOWER SURFACE

AIRCRAFT CONTROLS

The present invention relates to aircraft controls. It is particularly concerned with the exploitation of the dynamic characteristics of the operation of spoilers to alleviate the effects of large gusts on aircraft mainplanes in flight, and thereby to permit a reduction in the allowance for such occurrences in the structure or flight envelope of the aircraft.

During the course of rapid deployment of a conventional spoiler located on an aircraft mainplane, lift generated by the spoiler changes phase from positive to negative, as the flow re-attachment point leaves the trailing edge. The present invention provides means for attenuating the adverse lift and adapting the beneficial dynamic characteristics of spoiler deployment to alleviate the effects of large gusts and like turbulent atmospheres.

According to the present invention an aircraft with spoilers on the mainplanes thereof is characterised by
a sensor of gusts in the aircraft's path, and
spoiler drive means responsive to the sensor to deploy the spoilers to a negative lift phase commencement station without them generating significant positive lift on the mainplanes, and to move the spoilers through a negative lift phase whilst the gust is significantly effective.

Preferably a discriminator is provided whereby the spoilers are not activated in response to minor gusts or other minor disturbances, as also is an input a function of aircraft speed whereby spoiler deployment can be modified in accordance with airspeed.

For spoilers which actuate by rotation the required negative lift effect may be obtained by rotating the spoiler by between 100 and 1000 degrees per second. The effectiveness of spoilers operating in this mode is greatly enhanced, and the power required to drive them is minimised, if they are up to 20-30% perforated. In order to minimise drag generation by a stowed perforated spoiler a spoiler bed may be provided which mates with and fills the perforations.

The sensor may comprise a radiometric or infra-red device for detecting turbulence ahead of the aircraft, or it may comprise a pressure sensor or an accelerometer at a forward location on the aircraft. The spoiler drive means may have an airspeed input and be arranged to determine in accordance therewith the commencement time of spoiler operation, and perhaps spoiler operation rate and mode.

The hinge line of the spoiler is preferably at between 60 and 75% chord.

Generally the gusts with which one is particularly concerned are upward gusts, and the spoilers in accordance with the present inventions are located on the upper surface of the mainplane. To cater for downward gusts, spoilers may additionally be located on the mainplane lower surface, and the sensor means arranged to signal which type of gust is approaching.

A gust alleviating spoiler apparatus in accordance with the present invention will now be described by way of example with reference to the accompanying drawings, of which.

Figure 1:
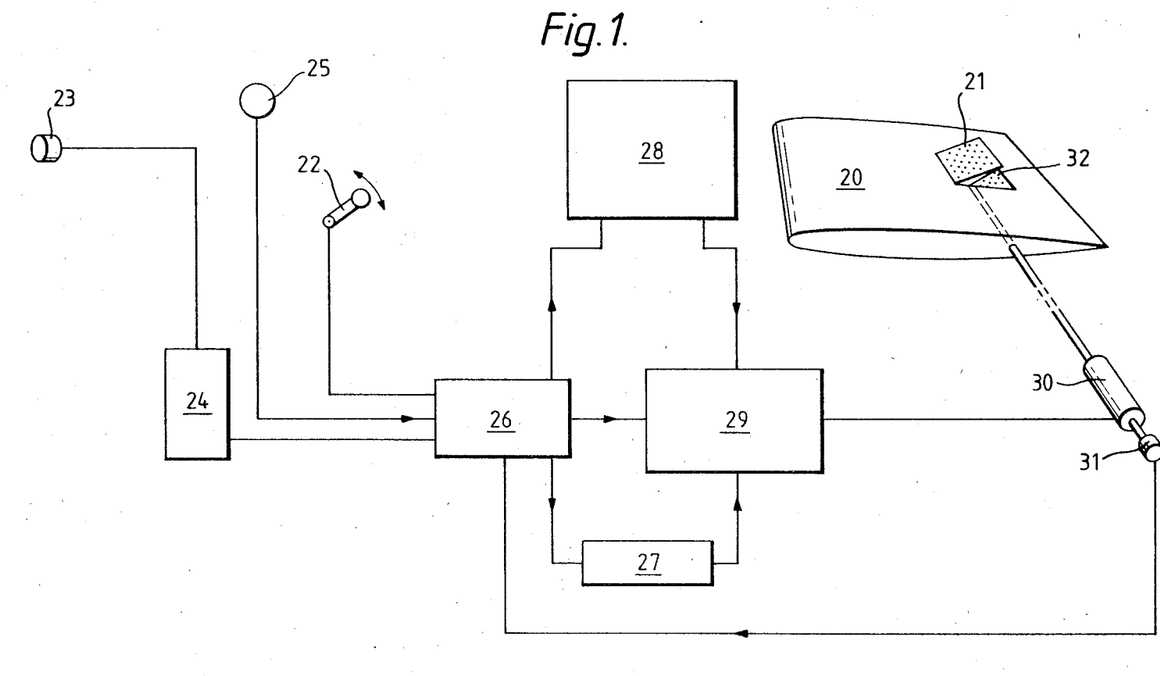
FIG. 1 is a schematic diagram of the apparatus on an aircraft.

As shown in FIG. 1 an aircraft wing 20 carries a spoiler 21 the hinge line whereof is at 65% chord. The active chord of the spoiler is 8% mean chord. The spoiler 21 is perforated with circular holes in equilateral triangular array so that it has 22.5% open area. The spoiler 21 is operated hydraulically in response to two control modes, a traditional spatial mode afforded by a lever 22 in the aircraft cockpit and a dynamic mode afforded by signals from a pressure sensor 23 at a forward location on the aircraft, if passed by a discriminator 24. Signals in both modes, together with a signal from an airspeed transducer 25, are fed to a hydraulic controller circuit 26. The remainder of the hydraulic circuit comprises an accumulator 27, an hydraulic power pack 28, a servo-valve unit 29, a rotary actuator 30 and a configuration sensor 31. The configuration sensor is arrayed to pass a feed back signal to the controller 26.

The spoiler retracts onto a bed 32 which is a rubber moulding arranged to mate with the spoiler perforations.

In operation of the spoiler in the manual/spatial mode the hydraulic circuit moves the spoiler 21 to the required configuration as set by the lever 22.

In operation of the spoiler in the dynamic mode, when the sensor 23 detects the arrival of an upgust it passes an appropriate signal to the discriminator 24. If the gust is significant the signal is passed to the controller 26, which determines from the signal from the airspeed transducer 25 when to commence deploying the spoiler 21. This deployment phase is effected comparatively slowly, so that the initial passage of the flow reattachment point to the trailing edge is quasi-steady, and no adverse or positive lift is generated, but also so that the negative lift phase thereof can commence as the upgust approaches maximum effectiveness. Commencing with the quasi-steady reattachment point at the trailing edge of the wing, the spoiler 21 is deployed comparatively much more rapidly in the negative lift phase, until it reaches the maximum allowable displacement at the particular flight condition. Typically this is 50° at low airspeeds but half that at $N=0.7$. A typical mean deployment rate is 400°/second. It is then immediately retracted at a similar mean rate.

The description referring to the FIGS. 2 to 11, which now follows, examines the effect of the dynamic operation of a spoiler in the manner described above.

Figure 2:
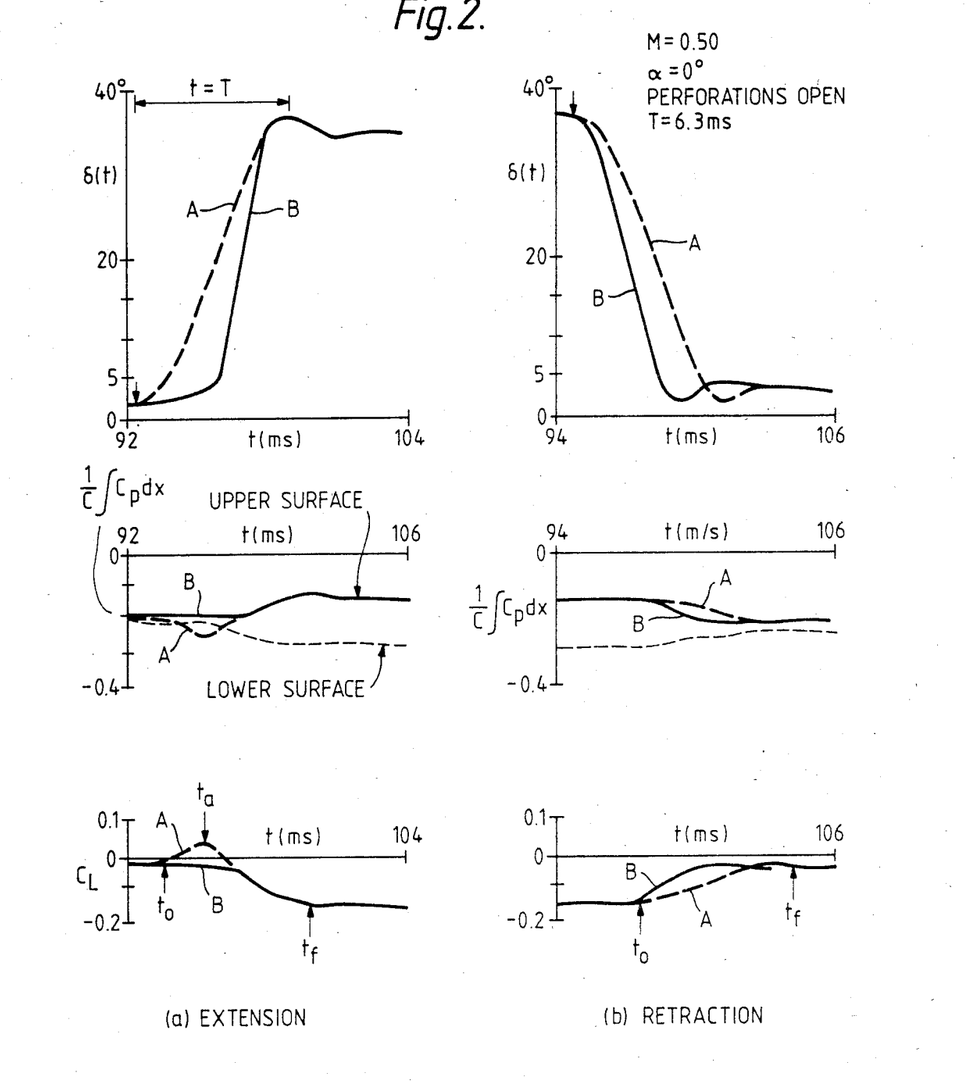
FIG. 2 shows typical integrated transient pressures during spoiler deployment and retraction.

FIG. 2 compares typical integrated transient pressures for extension and retraction of the spoiler 21. Plotted as functions of time are the spoiler deflection, δ, the integrated pressure coefficient of both upper and lower surfaces and the difference of these averages, the section lift coefficient.

The curves A demonstrate values obtained when the spoiler is deployed and retracted in continuous motions, according respectively to the functions $$\delta t = (\delta/2)(1 - \cos \omega t)$$

and $$\delta t = (\delta/2)(1 + \cos \omega t)$$

where t is a point in time after commencement, and ω is the rotation rate in radians per second, and the mean rate is 400° per second. As shown in FIG. 2a this mode of deployment generates an unwanted positive lift initially before generating a lift decrement.

By deploying the spoiler more slowly to 5°, where at M=0.50 the reattachment point reaches the trailing edge, and then deploying it more rapidly to 37°, as demonstrated by curve B, the decrement in $C_L$ can be obtained without the penalty of an initial increase.

With regard to retraction, a speeding up of the retraction time to 5° merely shortens the time in which the generated lift decrement is attenuated (FIG. 2b).

Figure 3:
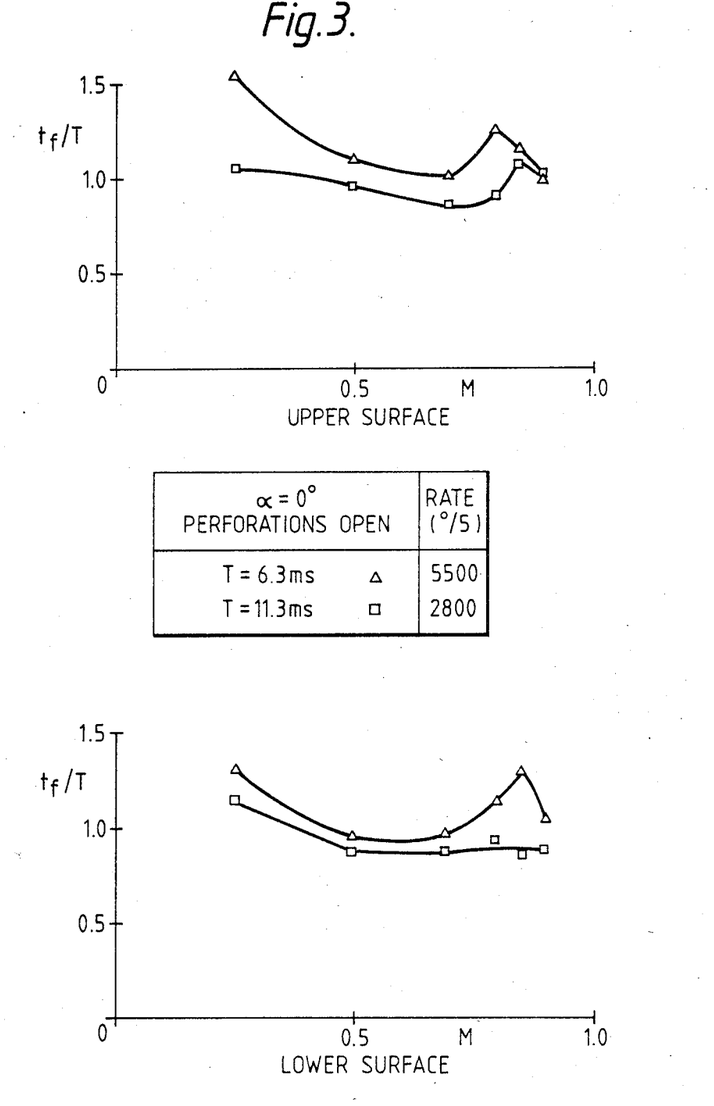
FIG. 3 shows the effect of spoiler deployment rate upon the time taken to generate a lift decrement, FIG. 4 correlates subsonic lift decrement phase times during spoiler deployment.

FIG. 3 shows the influence of spoiler rates on the delay times, that is the time before the operation takes effect, at various mach numbers. In that figure time t is expressed as a fraction of the time, T to full spoiler deployment.

As shown in the figure the time delay, $t_f/T$, also increases with the rate of spoiler motion, and is comparable on both upper and lower surfaces. For transonic speeds there is a small but significant increase in the delay times, which is more noticeable on the upper surface than on the lower surface.

It will be appreciated that the FIGS. 2–11 are based upon model tests, in which transition was fixed close to the leading edge to ensure an attached turbulent boundary layer of roughly constant thickness and because the subsequent separation from the spoiler has a much larger length scale (of the order of 0.3c) than the attached turbulent boundary layer. With these assumptions it is possible to recast the measured time delays for the two spoiler rates as a function of the aerodynamic rate of spoiler motion, UT/c, using the subsonic measurements at M=0.25, 0.50 and 0.70, where U=free stream velocity and c=local chord.

Figure 4:
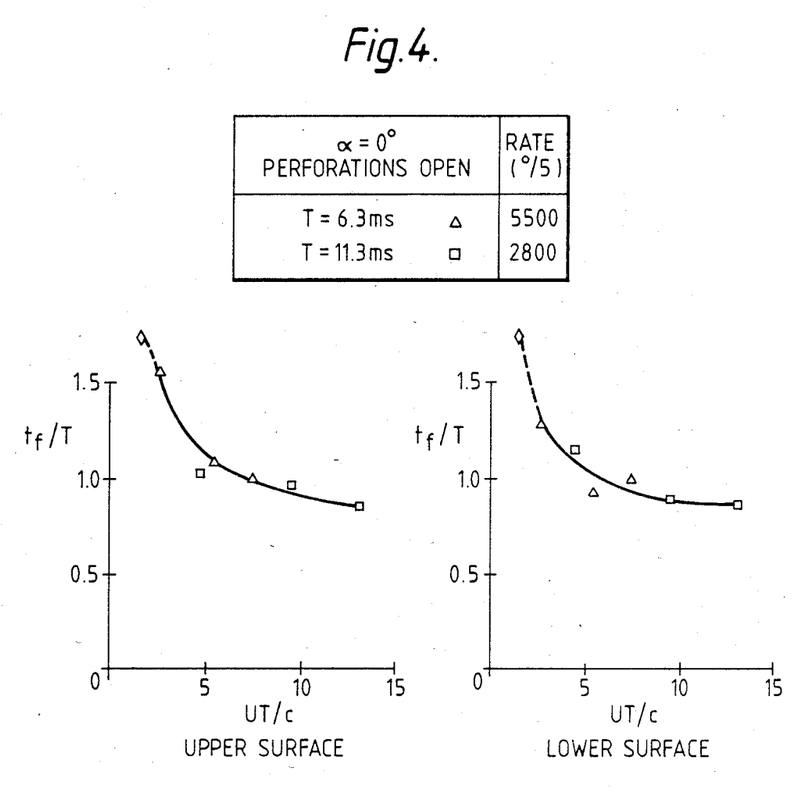

FIG. 4 shows the measured subsonic time delays from FIG. 3 re-plotted in terms of this parameter. For the lift decrement phase, determined by the time taken to establish the final large bubble, an excellent correlation is obtained on both surfaces.

Figure 5:
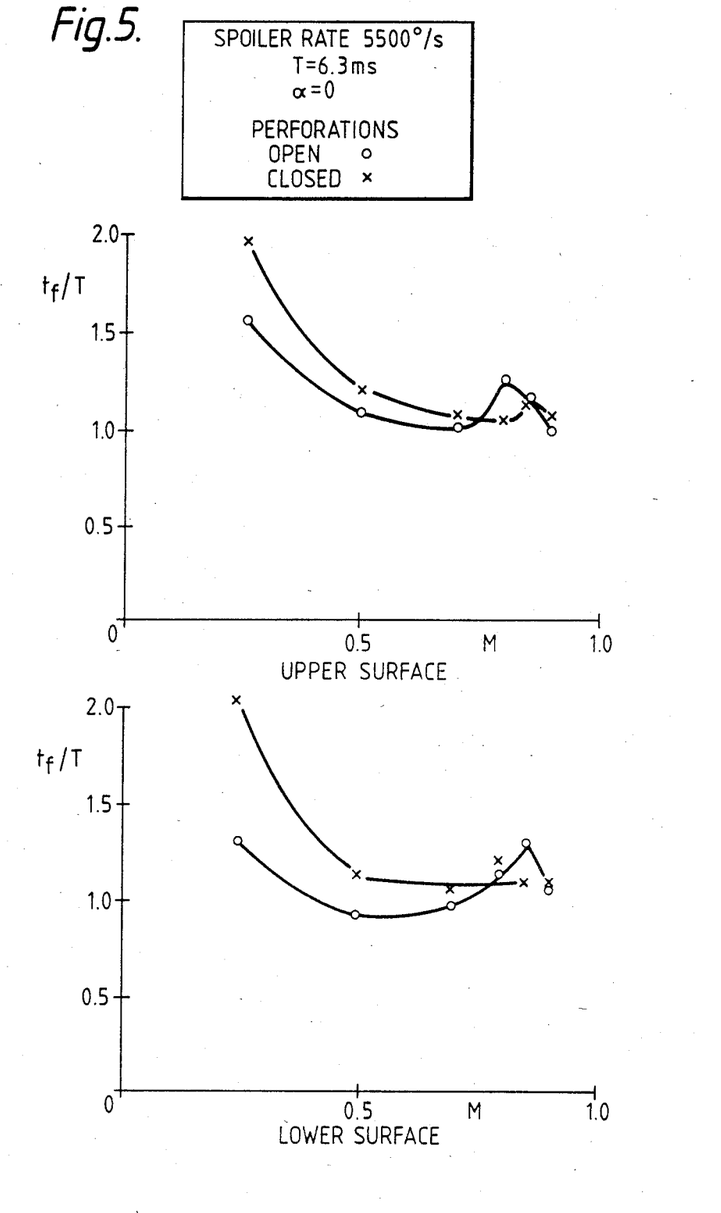
FIG. 5 shows the variation with Mach Number of the effect of spoiler porosity upon the lift decrement phase time.

The most important difference between the two spoiler configurations, perforations open and closed, relates to the delay times, $t_f/T$, to lift decrement. As can be seen in FIG. 5 with the perforations closed the delay times at subsonic speeds are significantly higher than with the perforations open. Indeed, for M=0.25 the final delay times are 30% higher with the perforations closed than with the perforations open. This difference probably reflects the fact that it is more difficult to establish a 'steady' shear flow from the trailing edge of the spoiler with the perforations closed than with the perforations open.

Figure 6:
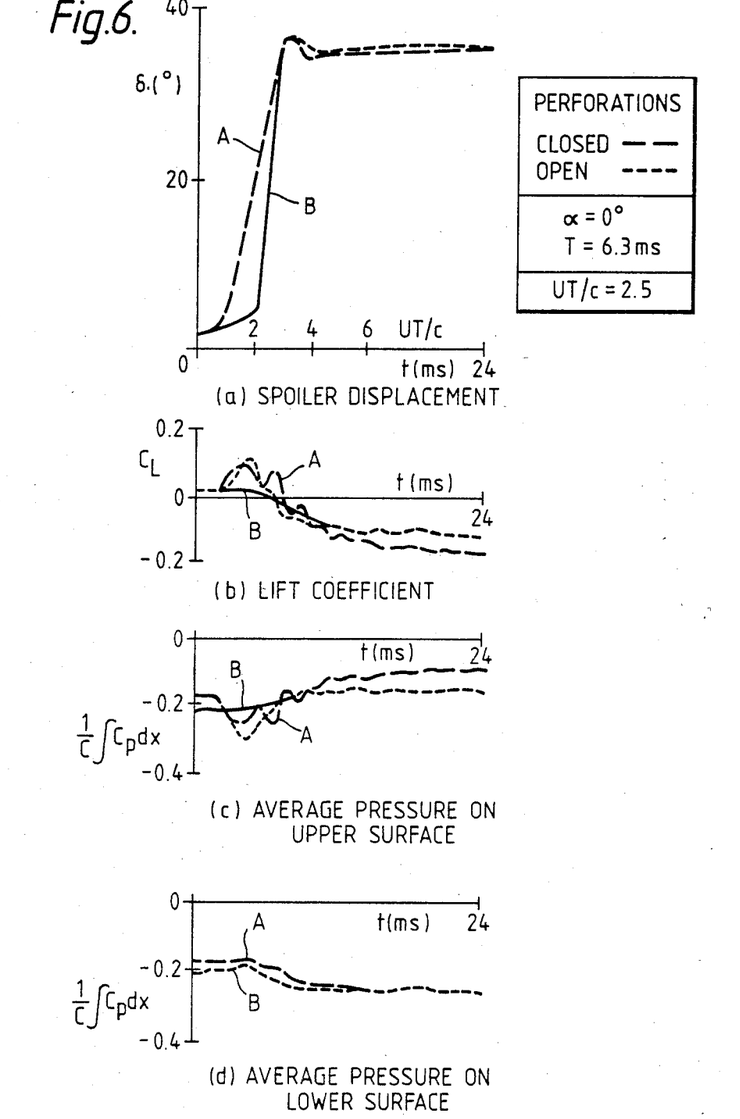
FIG. 6 illustrates the effect of spoiler porosity upon low speed spoiler characteristics.

The value of the perforations is particularly clearly shown in FIG. 6. With the perforations closed there is a succession of starting vortices on the upper surface (certainly two and possibly more). In contrast, with the perforations open there is only a single starting vortex. Once the positive lift has been reached, and it will be appreciated that this is relative to continuous deployment according to the function $$\delta t = (\delta/2)(1 - \cos \omega t)$$

the lift then decays smoothly (FIG. 6b). Although the transient time histories for either spoiler are not exactly repeatable, there is a clear difference in character at M=0.25 which is not observed at M=0.50. Hence these tests have highlighted an undesirable feature of the dynamic characteristics of the unperforated spoiler at low speeds, which may not readily be avoided by deploying the spoilers as per the invention. These lift excursions are essentially confined to the upper surface of the wing (FIG. 6c); there are only minor excursions on the lower surface (FIG. 6d). The result of deploying a perforated spoiler according to the invention, curve B, shows both elimination of the positive lift phase and smoothing of the lift decrement phase.

Figure 7:
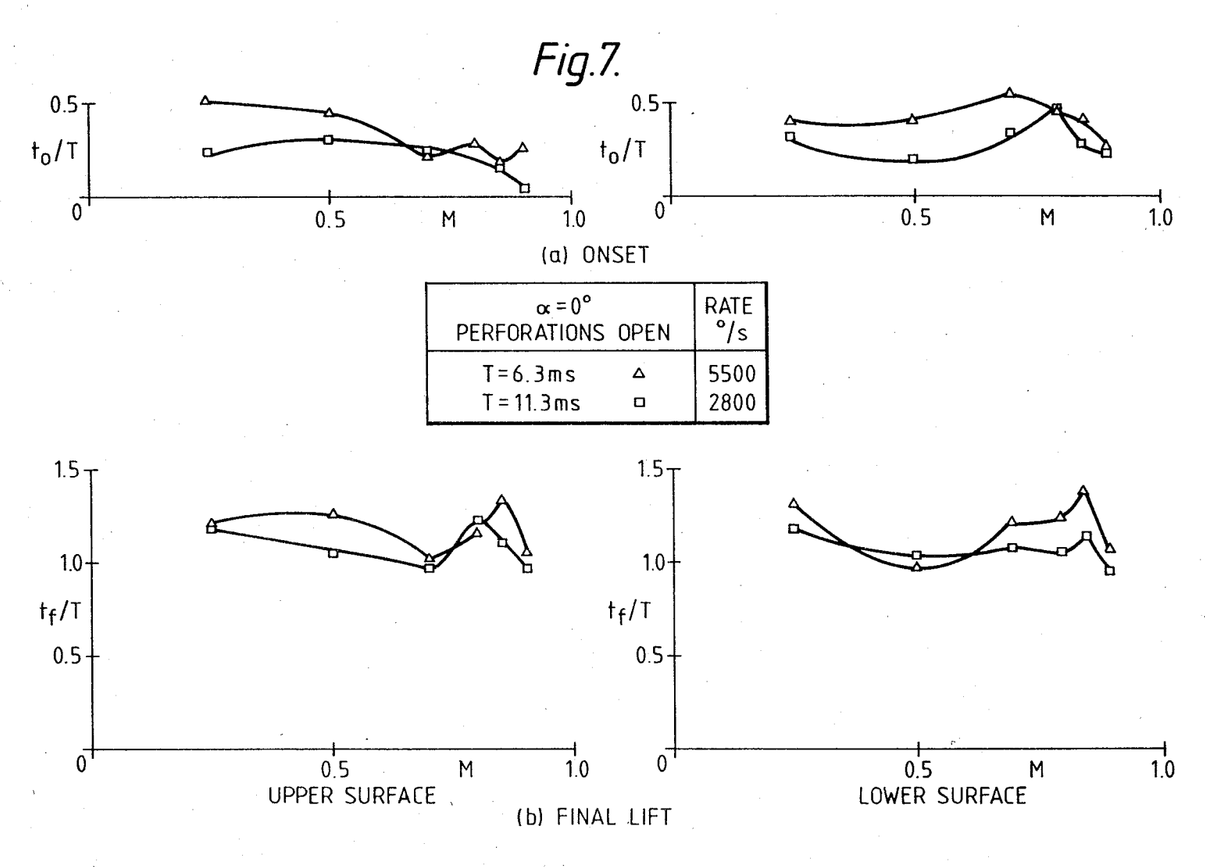
FIG. 7 shows the influence of spoiler rate on the time to attenuation of spoiler effects after retraction, FIG. 8 correlates times to spoiler effect attenuation for various subsonic speeds after retraction.

FIG. 7 shows the influence of spoiler rate on the delay times for rapid retraction as a function of Mach number. For low/moderate subsonic speeds (0.25<M<0.50) the first change in lift occurs almost simultaneously on the upper and lower surfaces at roughly $t_0/T=0.25$ and 0.40 respectively for the lower and higher rates of spoiler motion (FIG. 7a). This dynamic effect corresponds with the persistence of dynamic trailing-edge stall on a helicopter blade as the angle of incidence decreases for progressively higher rates of movement. The fact that the pressure distribution starts to change simultaneously on both surfaces is significant and suggests that for spoiler retraction, conditions at the trailing edge dominate the first stage of the process. (This is in contrast to the flow development for spoiler deployment of FIGS. 7 and 3). For transonic speeds (0.80≦M≦0.90) the delay times, $t_0/T$, are appreciably smaller and much the same for both spoiler rates. Again this behaviour is in contrast to that observed when the spoiler is extended.

The time delay for the final lift, $t_f/T$, is not strongly affected by the rate of spoiler motion, and is about the same for both upper and lower surfaces (FIG. 7b). These time delays for final lift are smaller for spoiler retraction than for spoiler extensions, particularly at subsonic speeds.

The aerodynamic rate of spoiler motion, UT/c, used to correlate the measurements for spoiler extension (FIG. 4), can also be used for spoiler retraction. For lift onset, determined by the first significant change in the size of the separation bubble, the result is somewhat disappointing, with no clear trend apparent on either the upper or lower surfaces (FIG. 8a).

Figure 8:
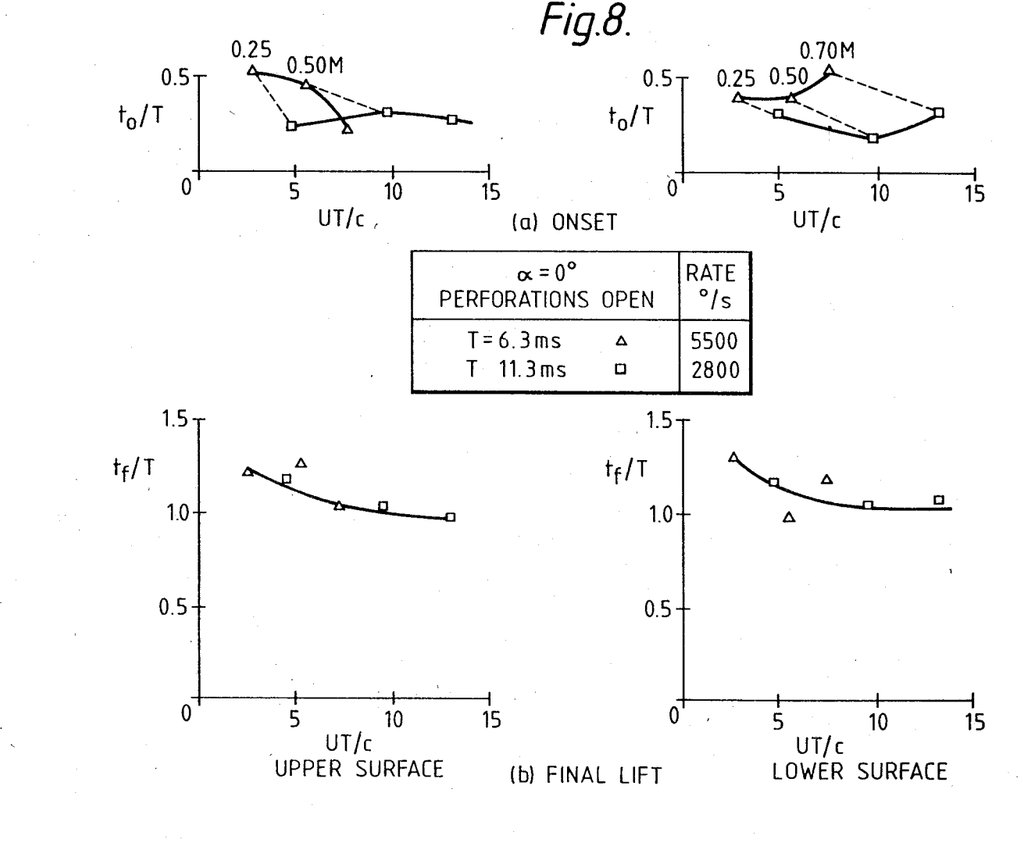

In contrast, for the final lift an excellent correlation is obtained on both surfaces (FIG. 8b). Both of these results are similar to those observed for spoiler extension.

Figure 9:
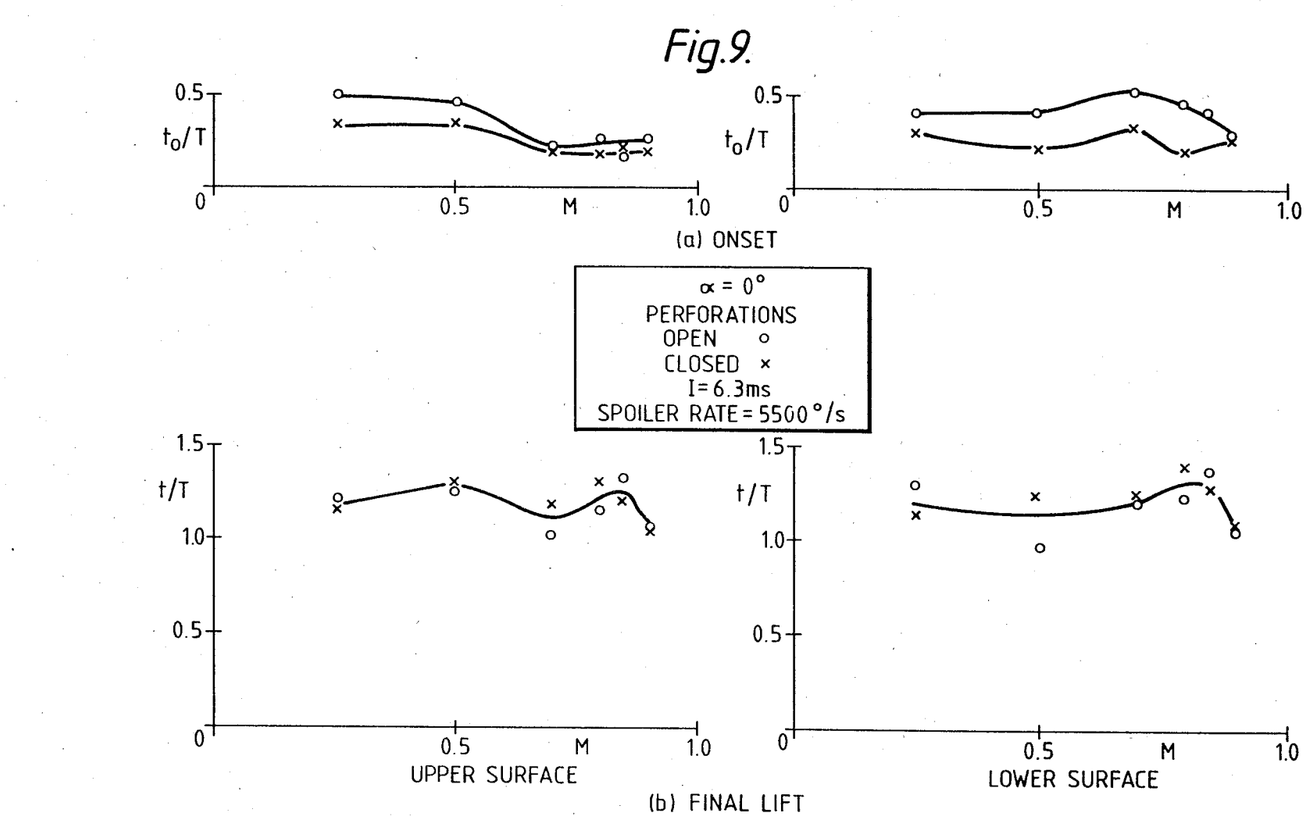
FIG. 9 shows the influence of spoiler porosity upon spoiler effect attenuation with retraction.

FIG. 9 shows the small effect of the spoiler porosity on the delay times for the highest rate of spoiler retraction. The onset of the lift change occurs a little earlier with the perforations closed than with the perforations open (FIG. 9a). The main feature of the spoiler retraction process may be visualised as the squeezing out of the mass of air enclosed in the bubble. This process would be opposed by opening the perforations (at least in the initial stages of the motion when the spoiler is moving slowly), and hence increase the delay times. There is little difference between the two spoiler configurations for the final delay times, $t_f/T$, which are almost the same on both surfaces (FIG. 9b). For subsonic speeds these times are appreciably shorter than, for the extension of the spoiler.

Figure 10:
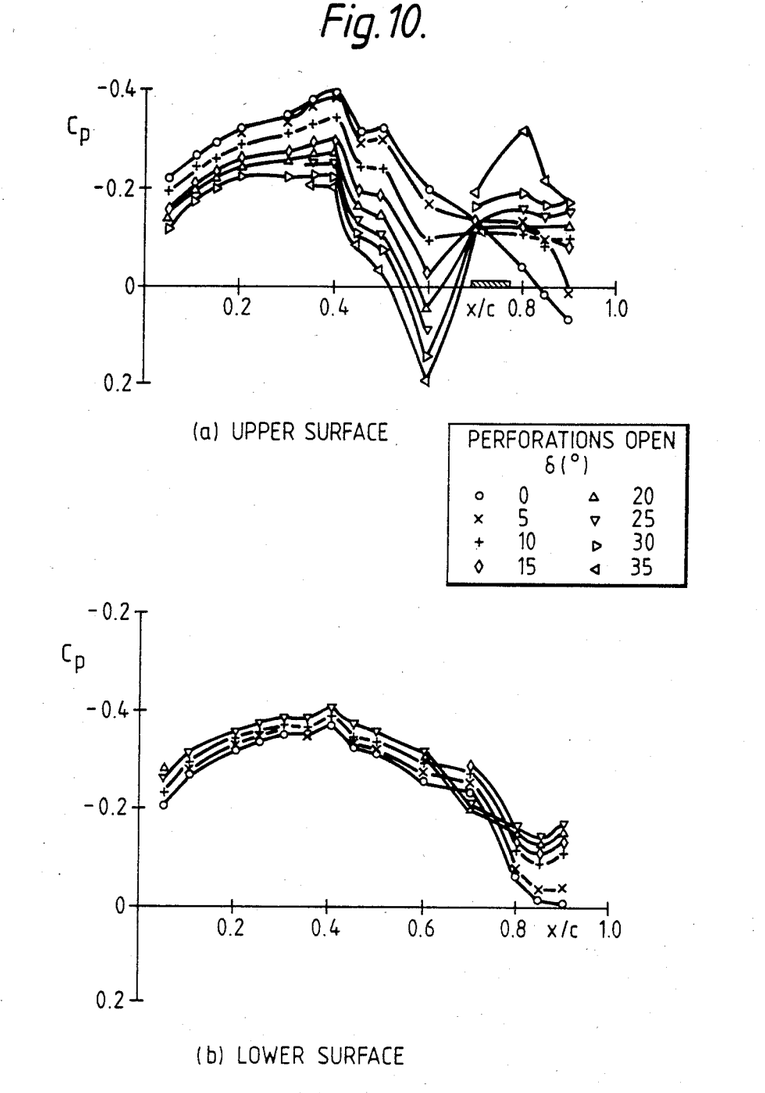
FIG. 10 shows typical quasi steady subsonic pressure distributions for different spoiler angles at ($M=0.50$, $\alpha=0°$)

FIG. 10 shows the steady, as distinct from transient, subsonic pressure distributions for different spoiler deflections. For the upper surface, FIG. 10a shows that for $\delta=5$ deg there are only small changes of pressure downstream of the spoiler, relative to the measurements for $\delta=0$ deg, and little change in trailing-edge pressure. Hence the flow must reattach downstream of the spoiler (probably at about $x/c=0.90$) and the change in lift is negligible. As the spoiler deflection increases from $\delta=10$ deg to 35 deg, the pressures upstream of the spoiler increase, and intensify the adverse pressure gradient, which extends from $x/c=0.40$ to 0.60. This strong adverse pressure gradient might cause a small scale separation in this region. In contrast, a strong favourable pressure gradient is observed just upstream of the spoiler ($x/c=0.60$ to 0.70), followed by a region of constant pressure extending to $x/c=0.90$. This constant pressure region indicates the upstream portion of a bubble, which must be visualised as closing in the wake downstream of the trailing edge. The net effects of these large changes in pressure are a significant increase in negative lift and large variations in the boundary layer displacement thickness. For the lower surface, FIG. 10b shows that for $\delta=5$ deg there are negligible pressure changes compared to $\delta=0$ deg. For large spoiler deflections ($\delta=10$ deg to 35 deg) the pressure decreases a little upstream of $x/c=0.70$ and reaches about $C_p=0.15$ towards the trailing edge ($x/c=0.80$ to 0.90). These small changes in the pressure distribution would produce quite small variations in the boundary layer displacement thickness.

Figure 11:
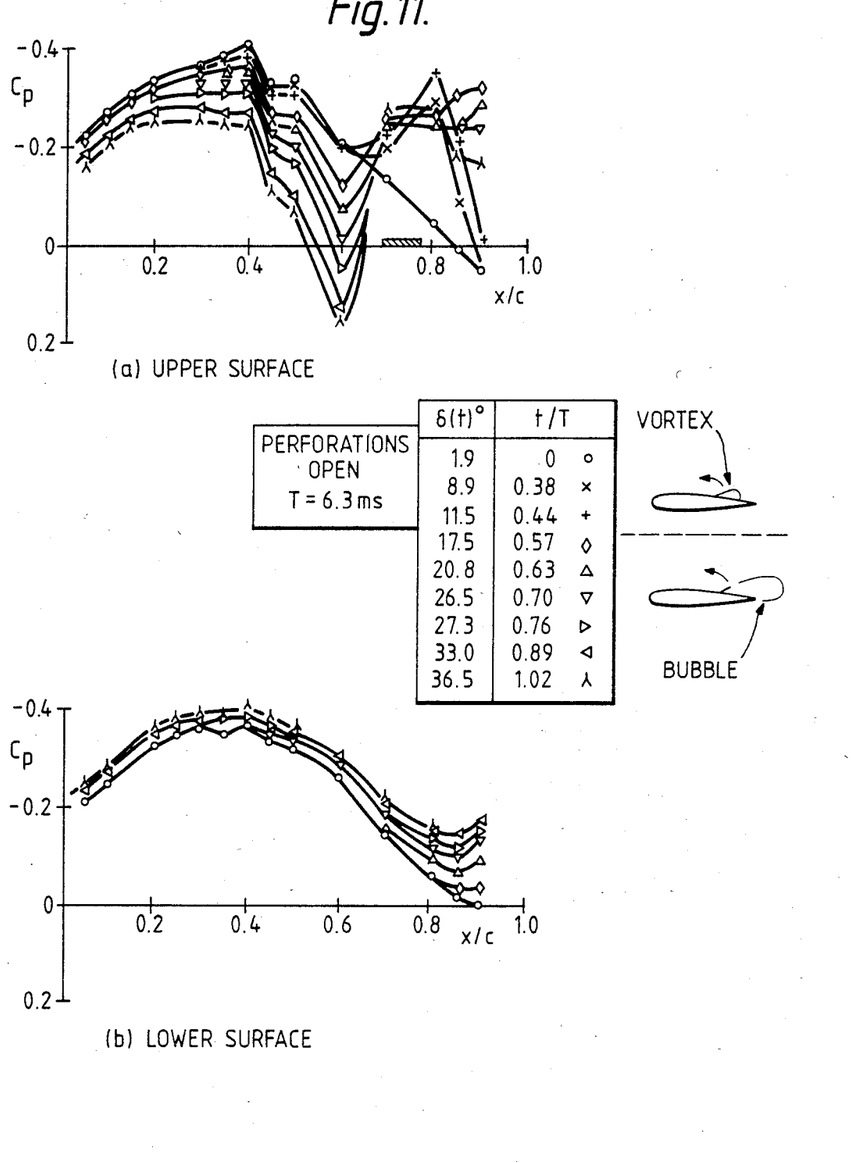
FIG. 11 shows typical subsonic time histories of chordwise lift for spoiler extension ($M=0.50$, $\alpha=0°$).

FIG. 11 shows the transient pressures measured for sudden extension of the spoiler at $M=0.50$, which are quite different in character from the corresponding steady measurements. For the initial spoiler deflection, about 2 deg, the pressure distributions are virtually the same on both surfaces and identical with the static measurements for $\delta=0$ deg (FIG. 10). Until about $t/T=0.38$, $\delta(t)=11.5$ deg, the pressures remain unchanged everywhere except on the upper surface downstream of the spoiler, where a large suction develops at about $x/c=0.80$, without the trailing-edge pressure changing significantly. (The time-dependent trailing-edge pressure could not be measured but for spoiler extension it can generally be roughly inferred by extrapolation of the pressures on the upper and lower surfaces.) This large suction on the upper surface, shown for $\delta(t)=8.9$ deg and 11.5 deg, produces the adverse lift effect already discussed, and is caused by the rapid formation of a strong starting vortex immediately downstream of the spoiler with a reattachment of the flow upstream of the trailing edge. This starting vortex is not a corresponding feature of the static measurements for $\delta=10$ deg (FIG. 10).

Returning to FIG. 11, by about $t/T=0.57$, $(t)=17.5$ deg, the trailing-edge pressure is much lower, which indicates that the separated flow from the spoiler no longer reattaches to the wing, but merges with the boundary layer from the lower surface downstream of the trailing edge, thus forming a closed bubble. On the upper surface there are now increases of pressure both at about $x/c=0.80$ and also upstream of the spoiler. These increases in pressure produce the first net loss in lift discussed previously. On the lower surface there is a small decrease in pressure at $x/c=0.85$ and 0.90, which is related with the large change in trailing-edge pressure. Thus the lower surface boundary layer is now under a favourable pressure gradient between $x/c=0.90$ and 1.00.

For $t_T>0.5$ the pressures on the upper surface remain roughly constant from $x/c=0.70$ to 0.90, under the upstream portion of the large separated flow bubble, where there is little mixing of the shear layer. In contrast there are large progressive increases in pressure on the upper surface upstream of the spoiler as $\delta(t)$ increases. Similarly in the lower surface there are small progressive decreases in pressure as $\delta(t)$ increases.

The two distinct types of flow are sketched in FIG. 11. Although these shear flows are generally comparable with the corresponding steady flows, they must be different in scale and structure because of the radically different pressure distributions downstream of the spoiler on the upper surface. However on the upper surface upstream of the spoiler, and on the complete lower surface, the pressure distributions are similar in character, but displaced a little from the steady distributions. Hence we may reasonably infer that the effects of the spoiler motion are more noticeable where the flow is locally separated than where it is attached.

It will be perceived then that a mode of realization of the present invention is to deploy the spoiler to $\delta=5°$ slowly enough to have no significant effect upon lift, as illustrated by the quasi steady pressure distributions in FIG. 10; then to deploy it rapidly from $\delta=5°$ in order to take advantage of the negative lift generated in transience.

There is no prima facie reason why the effects of spoiler deployment and retraction should be essentially different in character when the wing is at positive incidence at cruise (say 3 deg) or during the initial approach (say 8 deg), as long as the flow is attached. Low speed wind tunnel and flight dynamic tests confirm this, showing that the final time lags, $t_f$, do not vary significantly for attached flows with lift coefficients varying from 0.2 to 1.0. Similarly static spoiler characteristics are generally insensitive to variations in the angle of incidence as long as the wing flow is attached. Thus low speed measurements ($M=0.13$, $R=2.2\times10^6$) of wing lift and spoiler hinge moment show that the spoiler characteristics vary little from 0 to 14 deg incidence, for a configuration with a hinge line at $x/c=0.73$. This is quite close to the hinge line on the present configuration at $x/c=0.69$. Hence there should not be any large effect of the angle of incidence variation on the static characteristics, at least at subsonic speeds.

For transonic speeds the shock on the upper surface is always upstream of the spoiler hinge line. Downstream of the shock the pressure distributions are subsonic in character. Hence there should be no significant incidence effects unless the upper surface shock passed well downstream of the hinge line, eg for zero incidence at a Mach number of, say, $M=0.95$. This is an unrealistic condition for a conventional wing. However on an advanced supercritical wing at the cruise condition (say $M=0.80$ at $C_L=0.4$), the shock on the upper surface might well be between $x/c=0.70$ and 0.80. Then with the spoiler hinge line still at x/c=0.69 the character of the measurements could be quite different, and sensitive to variations in the angle of incidence in which case incidence information may need to be fed into the spoiler control 26.

The tests described above therefore show that for the rapid rates of spoiler operation envisaged in flight (400 deg/s corresponding with about UT/c=5 at M=0.5), the final lift for spoiler extension or retraction is reached by a time $t_f/T$ about 1 (see FIGS. 4 and 8). Thus in the final stages the lift development almost keeps up with the spoiler motion. The final lift is thus achieved after a short delay time of $$(Ut_f/c) = 5.0$$

even though the viscous flow incorporates a large bubble when the spoiler is fully extended. This comparison suggests that some simple form of unsteady potential flow theory, incorporating the development of the wake from the moving spoiler, might suffice to predict the spoiler dynamic characteristics.

I claim:

1. Gust alleviating spoiler apparatus on an aircraft, said apparatus comprising hinged spoilers on the mainplanes of the aircraft, wherein said spoilers are hinged at their leading edges, a sensor of gusts in the aircraft's path, said sensor being at a forward location on the aircraft, and spoiler drive means responsive to output from said sensor for rotating said spoilers at a first angular rate to a first angular displacement, said first angular rate being sufficiently low to ensure that significant positive lift is not generated thereby, and for further rotating said spoilers at a higher angular rate than said first rate to reduce mainplane lift while the gust is significantly effective.

2. Apparatus as claimed in claim 1 and incorporating a discriminator whereby the spoilers are not activated in response to minor gusts or other minor disturbances.

3. Apparatus as claimed in claim 1 and incorporating as input a function of aircraft speed whereby spoiler angular displacement is determined in accordance with airspeed.

4. Apparatus as claimed in claim 1 and wherein said spoilers are 20–30% perforated.

5. Apparatus as claimed in claim 4 and having spoiler beds which mate with and fill the perforations in the spoilers when the spoilers are stowed.

6. Apparatus as claimed in claim 1 and wherein said sensor is a pressure sensor.

7. Apparatus as claimed in claim 1 and wherein said sensor is an accelerometer.

8. Apparatus as claimed in claim 1 and wherein said sensor is a radiometric device.

9. Apparatus as claimed in claim 1 and wherein the hinge line of said spoilers is at 60–75% chord.

10. Apparatus as claimed in claim 1 and wherein said spoilers are located on the upper surface of the mainplane.

11. Apparatus as claimed in claim 10 and wherein spoilers are additionally located on the mainplane lower surface, and the sensor means arranged to signal which type of gust is approaching.

* * * * *